(12) United States Patent
Berenguer et al.

(10) Patent No.: US 7,660,363 B2
(45) Date of Patent: *__Feb. 9, 2010__

(54) MINIMUM ERROR RATE LATTICE SPACE TIME CODES FOR WIRELESS COMMUNICATION

(75) Inventors: Ignacio Berenguer, Madrid (ES); Xiaodong Wang, New York, NY (US); Mohammad Madihian, Plainsboro, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 568 days.

This patent is subject to a terminal disclaimer.

(21) Appl. No.: 11/278,270

(22) Filed: Mar. 31, 2006

(65) Prior Publication Data

US 2007/0217537 A1    Sep. 20, 2007

Related U.S. Application Data

(60) Provisional application No. 60/710,078, filed on Aug. 22, 2005.

(51) Int. Cl.
 *H04B 7/02*   (2006.01)
(52) U.S. Cl. ..................... 375/267; 455/101
(58) Field of Classification Search ................ 375/267, 375/299, 347, 349; 455/8, 101, 103, 132, 455/133
See application file for complete search history.

(56) References Cited

U.S. PATENT DOCUMENTS 7,366,248 B2 *   4/2008   Wang et al. ................. 375/267

* cited by examiner

*Primary Examiner*—Kevin Y Kim
(74) *Attorney, Agent, or Firm*—Joseph J. Kolodka

(57) ABSTRACT

A lattice space time coding arrangement for transmission systems is disclosed which enables construction of lattice space time codes with improved error rate performance for arbitrary receiver structures.

8 Claims, 3 Drawing Sheets

(A)

ML : $\hat{z} = \arg \min_{Gz+u \in C} |y - Hu - HGz|^2$

NAIVE : $\hat{z} = \arg \min_{z \in Z^{2MT}} |y - Hu - HGz|^2$

MMSE GDFE : $\hat{z} = \arg \min_{z \in Z^{2MT}} |Fy - Bu - BGz|^2$

MMSE-GDFE LRA linear : $\hat{z} = PQ((BGP)^{-1}(Fy - FHu))$

All the vectors have dimension $2MT$ (B)

MINIMUM ERROR RATE LATTICE SPACE TIME CODES FOR WIRELESS COMMUNICATION

This application claims the benefit of and is a non-provisional of U.S. Provisional Application No. 60/710,078, entitled "DESIGN OF MINIMUM ERROR RATE LATTICE SPACE TIME (LAST) CODES," filed on Aug. 22, 2005, the contents of which are incorporated by reference herein.

BACKGROUND OF INVENTION

The invention relates to wireless communications and, more particularly, to space time coding techniques for wireless communications.

Wireless communications using multiple transmit and receive antennas can increase the multiplexing gain (i.e., symbol throughput) and diversity gain (i.e., robustness) of communication systems in fading channels. It has been shown that for any given number of antennas there is a fundamental tradeoff between these two goals. A practical coding technique which maximizes these two goals is referred to as lattice space time (LAST) coding, which can be efficiently decoded with receivers of lower complexity than the maximum likelihood decoder. See, e.g., H. El Gamal, G. Caire, M. O. Damen, "Lattice Coding and Decoding Achieve the Optimal Diversity-Multiplexing Tradeoff of MIMO Channels," IEEE Transactions on Information Theory, Vol. 50, No. 6 (June 2004). Unfortunately, the diversity-multiplexing tradeoff frame-work does not say anything about the coding gain or error rate at the signal-to-noise (SNR) ratios of interest. That is, for two LAST code designs with the same tradeoff, different error rate performance can be obtained in the signal-to-noise ratios of interest. Finding the LAST code within a family of LAST codes which minimizes the error rate is complicated by the lack of a closed-form expression for the error rate. Prior art LAST code designs disclose lattices which are error rate optimal only for the single antenna AWGN channel and the maximum likelihood decoder. These lattices, however, are not necessarily error optimal for the general MIMO fading channel or for other receiver structures.

Accordingly, there is a need for a new approach to the construction of lattice space-time codes that can optimize error rates across different decoder structures.

SUMMARY OF INVENTION

A design methodology is disclosed herein which is capable of constructing lattice space-time codes with improved error rate performance for arbitrary receiver structures. An initial lattice generator is selected for the lattice space time code, and a series of simulated observations are generated based on a model of the known communication channel characteristics. The simulated observations are decoded using a selected receiver structure so as to compute an error rate for the lattice generator. An estimate of the gradient for the error rate as a function of the lattice generator is obtained, and the gradient estimate is used to update the lattice generator for the lattice space time code. This procedure can be iterated until convergence to an optimal lattice generator for the lattice space time code. The lattice space time codes can then be used to encode transmissions from a transmitter to a receiver with the selected receiver structure.

The disclosed technique can be applied to optimize lattice space time codes for a wide range of receiver structures, channel statistics, and even cooperative relaying. These and other advantages of the invention will be apparent to those of ordinary skill in the art by reference to the following detailed description and the accompanying drawings.

DETAILED DESCRIPTION

A multiple-input multiple-output (MIMO) communication system with M-transmit and N-receive antennas can be modeled as follows. The wireless channel, which herein is assumed to be quasistatic and flat fading, can be represented by a N×M matrix $H^c$ whose elements $h_{ij}^c$ represents the complex gain of the channel between the jth transmit antenna and the ith receive antenna and is assumed to remain fixed for $t=1, \ldots, T$. The received signal can be expressed as $$y_t^c = \sqrt{\frac{\rho}{M}} H^c x_t^c + w_t^c,$$

where $\{x_t^c \in \mathbb{C}^M : t=1, \ldots, T\}$ is the transmitted signal, $\{y_t^c \in \mathbb{C}^M : t=1, \ldots, T\}$ is the received signal, $\{w_t^c \in \mathbb{C}^M : t=1, \ldots, T\}$ denotes the channel Gaussian noise, and with the power constraint $E\{1/T \sum_{t=1}^{t} |x_t^c|^2\} \leq M$, the parameter $\rho$ is the average SNR per receive antenna independent of the number of transmit antennas. The entries of $w_t$ are independent and identically distributed (i.i.d) circularly symmetric complex Gaussian variables with unit variance, i.e., $w_{t,i} \sim N_c(0, 1)$. The equivalent real channel model corresponding to T symbol intervals can be written as $$y = Hx + w$$

where $x = [x_1^T, \ldots x_T^T]^T$ is a codeword belonging to a codebook C with $$x_t^T = [\Re\{x_c^T\}^T, \Im\{x_c^T\}^T]^T,$$
$$w = [w_1^T, \ldots w_T^T]^T \text{ with}$$
$$w_t^T = [\Re\{w_c^T\}^T, \Im\{w_c^T\}^T]^T,$$

and $$H = \sqrt{\frac{\rho}{M}} I \otimes \begin{bmatrix} \Re\{H^c\} & -\Im\{H^c\} \\ \Im\{H^c\} & \Re\{H^c\} \end{bmatrix}.$$

It is assumed, without limitation, that the receiver has channel state information (CSI) but that there need not be channel state information at the transmitter.

The goal is to construct a codebook $C \subseteq \mathbb{R}^{2MT}$ with the constraint that the codewords $x \in C$ belong to a lattice and satisfy the power constraint $$\frac{1}{|C|} \sum_{x \in C} |x|^2 \leq MT.$$

Note that the rate of the code would be $R = 1/T \log_2 |C|$ bit/s/Hz.

Figure 1:
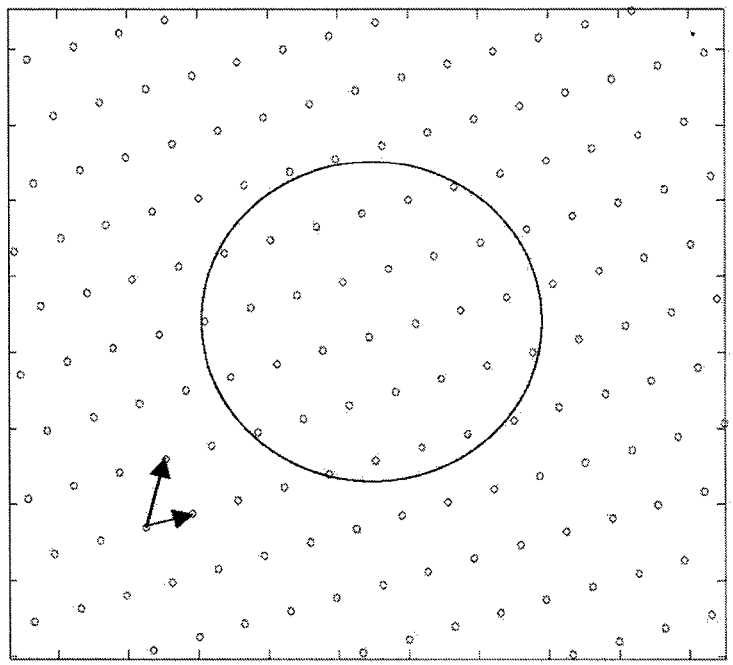
FIGS. 1A and 1B illustrate the concept of lattice space time codes.
Figure 1:
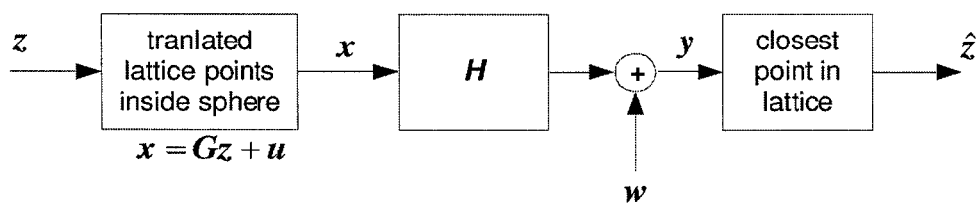

An n-dimensional lattice $\Lambda$ can be defined by a set of n basis (column) vectors $g_1, \ldots, g_n$ in $\mathbb{R}^n$. The lattice is composed of all integral combinations of the basis vectors, i.e., $$\Lambda = \{x = Gz : z \in \mathbb{Z}^n\}$$

where $\mathbb{Z} = \{0, \pm 1, \pm 2, \ldots\}$, and the n×n generator matrix G is given by $G = [g_1, g_2, \ldots, g_n]$. FIG. 1A illustrates an example 2-dimensional lattice with two basis vectors $g_1$ and $g_2$. Note that the zero vector is always a lattice point and that G is not unique for a given $\Lambda$. In the Euclidean space, the closest lattice point quantizer $Q(\cdot)$ associated with $\Lambda$ is defined by $$Q(r) = x \in \Lambda, \text{ if } \|r - x\| \leq \|r - x'\|, \forall x' \in \Lambda.$$

The Voronoi cell of $\Lambda$ is the set of points in $\mathbb{R}^n$ closest to the zero codeword, i.e., $$V_o = \{r \in \mathbb{R}^n : Q(r) = 0\}$$

The Voronoi cell associated with each $x \in \Lambda$ is a shift of $v_o$ by $x$. The volume of the Voronoi cell is given by $V(\Lambda) = \sqrt{\det(G^T G)}$.

Consider the dimension of the lattice generated by G to be n=2MT. A finite set of points in the n-dimensional lattice can be used as codewords of a codebook C. Given a bit rate R bit/s/Hz, the codebook will contain $|C| = 2^{T \cdot R}$ lattice points. In particular, the codewords consist of all lattice points inside a shaping region S. FIG. 1A shows the shaping region for the example lattice. In spherical LAST codes, the shaping region is a sphere, having in general the lowest possible energy. To find the code with smallest total average power, consider the codebook obtained using a sphere centered at $-u \in \mathbb{R}^n$ and the codeword coordinates are given by the Euclidean difference between the center of the sphere ad the lattice points. That is, the code is specified by the generator matrix G, the translation vector u, and the radius of the sphere, i.e., $$C = (\Lambda + u) \cap S$$

where the cardinality of the codebook (i.e., the rate) is a function of the radius of the sphere. If one forms the intersection of the sphere of volume V(S) with the lattice of Voronoi volume $V(\Lambda)$ one could expect to obtain a code with about $V(S)/V(\Lambda)$ codewords. In fact, the value $V(S)/V(\Lambda)$ is correct in the average, although it is clear that there are some that have more and some that have less. It can be readily proven that there exists at least a $u \in \mathbb{R}^n$ such that $|(\Lambda + u) \cap S| \geq V(S)/V(\Lambda)$. Among all the choices of u, it would be advantageous to seek the one that leads to a code of the smallest average energy $1/|c| \Sigma_{x \in C} |x|^2$. Using the centroid, an iterative algorithm can be used to find the translation vector u which generates a codebook with minimum energy. Hence, given a translation vector, the codewords are obtained by taking $|C|$ lattice points in the shifted lattice $\Lambda + u$ that are closer to u. (Herein, x or its integer coordinates z is used to refer to each codeword, since for any codeword, x there is a univocal relation $x = Gz + u$). To speed up the enumeration of all the lattice points of the sphere centered at u, the radius of the sphere or the lattice generator can be scaled such that $V(S)/V(\Lambda) \cong |C|^2$. Once the codewords have been found, a second scaling factor $\beta$ should be applied to guarantee the energy constraint at the transmitter MT, i.e., $$\beta = \left( \frac{MT|C|}{\sum_{x \in c} |x|^2} \right)^{1/2} \quad (1)$$

and the translation vector and the generator are scaled as $\beta G$ and $\beta u$, respectively.

FIG. 1B illustrates the operation of a lattice space time code detector in the MIMO system. Given the above-described input-output relation, the task of the LAST detector is to recover the transmitted codeword x (or its corresponding integer coordinates z) from the received signal y. FIG. 1B sets forth an overview of a variety of different types of spherical LAST codes and different detectors.

Maximum Likelihood Decoding. The maximum likelihood detector (ML) is the optimal receiver in terms of error rate. The ML detection rule is given by $$\hat{z} = \arg \min_{Gz + u \in c} \|y - Hu - HGz\|.$$

The minimization is performed over all possible codewords in the codebook C. Note that the decoding regions are not identical due to the boundary of the codebook and, in fact, some are not bounded. This breaks the symmetry of the lattice structure in the decoding process, making the decoding process too complex.

MMSE-GDFE Lattice Decoder. In lattice decoding, the receiver is not aware of the boundary of the codebook (e.g., spherical shaping region S in spherical LAST codes) and assumes that any point in the infinite lattice may be transmitted, corresponding to infinite power and transmission rate. For a given lattice, the lattice decoder will search for the lattice point that is nearest to the received vector, whether or not lies in S. Note that this receiver should be distinguished from the nearest-codeword decoder, which decodes to the nearest lattice point inside S. This decoder is known as the naive closest point in the lattice $$\hat{z} = \arg \min_{z \in \mathbb{R}^{2MT}} \|y - Hu - HGz\|.$$

The attractive symmetry and periodic properties commonly associated with lattices allow low complexity algorithms to solve the closest point in the lattice problem above.

It has been shown that a MMSE-GDFE front-end can further improve the performance of the lattice decoding algorithms in MIMO systems. Given uncorrelated inputs and noise, with mean zero and covariance I, the feedforward (FF) and feedback (FB) MMSE-GDFE matrices are given by F and B respectively. In particular, B is obtained from the Cholesky factorization $B^T B = I_{2MT} + H^T H$ and is upper triangular with positive diagonal elements and $F^T = HB^{-1}$. Then, the MMSE-GDFE closest point lattice decoder returns $$\hat{z} = \arg \min_{z \in \mathbb{Z}^{2MT}} \|Fy - Bu - BGz\|.$$

which essentially finds the point in the lattice generated by BG that is closer to the received point Fy−Bu.

MMSE-GDFE lattice-reduction-aided linear receiver. A combination of the MMSE-GDFE front-end and the lattice-reduction-aided (LRA) linear receiver can be used to simplify the detector. The LRA receiver makes a change of basis such that the decision regions of the detectors are improved and more robust against noise. The change of basis is obtained via lattice reduction. Consider the MMSE-GDFE matrices F and B. Apply the MMSE-GDFE front-end and remove the translation vector $$y' = Fy - FHu = BGz + \underbrace{Fw - [B - FH]Gz}_{n} = BGz + n$$

where the term BGz has been added and subtracted. Consider the lattice with generator matrix BG. If BG is a basis of the lattice, BGP is also a basis of the same lattice if P and $P^{-1}$ have integer entries. The aim of the LRA receiver is to find a change of basis P that transforms the generator into BGP to optimize the decision regions of the detector. This problem is known as the lattice reduction problem. The goal of lattice basis reduction is, given an arbitrary lattice basis, obtain a basis of the shortest possible vectors; that is, vectors as close as possible to mutually orthogonal. The simplest way to reduce the basis is the LLL reduction algorithm. Other types of reduced bases are the Korkin-Zolotarev (KZ) basis, the Minkowski basis, the Seysen basis, and hybrids, which have different reduction criteria. These bases have, in general, slightly better properties (they are usually LLL reduced too), although the reduction is more time consuming. The idea behind LRA linear receivers is to assume that the signal was transmitted in the reduced basis, i.e., $y'=BGP(P^{-1}z)+n$, equalize in the new basis, which is more robust against noise enhancement, and return the decoded symbol to the original basis. That is, $$\hat{z} = PQ((BGP)^{-1}y')$$

where the quantizer $Q(\cdot)$ rounds to the nearest integer.

Other receivers. Other receivers can be used such as standard linear receivers or nulling and cancellation in combination with lattice reduction and the MMSE-GDGE front-end.

Note that the analytical expression for the error rate performance in any of the detectors presented above is intractable. In an n-dimensional Euclidean space and AWGN channels, one can design a lattice code with a best arrangement of points in the space such that for a given number of codewords, transmit power constraint, and noise statistics, the probability of error of the maximum likelihood decoder is minimized. In this situation, there are a number of desirable properties that a code should satisfy: (a) the number of code vectors should be large; (b) the average energy (or alternatively the peak energy) should be small, that is, the regions of space defining the code should be nearly spherical as possible; (c) the minimum distance between codewords should be large; mapping and demapping should be easily implemented; (d) given an arbitrary point in the space, it should be easy to find the closest codeword. Although good lattice codes have been found for different dimensions of this design problem, wireless MIMO communications do not signal over AWGN channels but over fading channels, with some known statistics. Moreover, the preferable receiver is not necessarily the complex ML decoder. Moreover, good lattice codes for the AWGN channel and the ML decoder are not necessarily good for MIMO fading channels.

The goal is to compute the optimal lattice generator matrix G so as to minimize the average block error rate probability denoted as Y(G) (i.e., objective function) with the following power constraint $$\min_{G \in \Theta} Y(G), \text{ with } \Theta = \left\{ G: \sum_{Gz+u \in C} |Gz + u|^2 \leq MT \right\} \quad (2)$$

where the constraint is achieved through the scaling factor $\beta$ set forth above. Notice that either x or Gz+u are used to refer to codewords. Denote $\gamma(y, z, H, G)$ as the empirical (noisy) block error rate for a given generator matrix G, transmitted coordinates z, received signal y, and channel matrix H, i.e., $\gamma(y, z, H, G)=1$ if $\hat{z}=z$ and 0 otherwise. Then the average symbol error rate is obtained by $Y(G)=E\{\gamma(y, z, H, G)\}$.

Since in general there is no closed form expression for the average block error rate Y(G), it is instead advantageous to use a stochastic gradient approach to optimize it. See co-pending commonly-assigned U.S. patent application Ser. No. 10/898,917, entitled "OPTIMIZED RATE SPACE TIME CODES FOR WIRELESS COMMUNICATION," filed Jul. 26, 2004, the contents of which are incorporated herein by reference. The aim of the gradient estimation is to compute an unbiased estimate of the true gradient. Let $\hat{g}(G)$ denote an estimate of $\nabla_G Y(G)$. Consider the case in which $E\{\hat{g}(G)\}=\nabla_G Y(G)$. The constrained Robbins-Monro (R-M) simulation-based algorithm is of the form $$G_{k+1} = \Pi_\Theta(G_k - a_k \hat{g}(G_k))$$

where $G_k$ is the solution after the kth iteration, $\hat{g}(G_k)$ is an estimate of $\nabla_G Y(G)|_{G=G_k}$, $\{a_k\}$ is a decreasing step size sequence of positive real numbers such that $\Sigma_{k=1}^{\infty} a_k = \infty$, and the function $\Pi_{73}$ projects each matrix $G_k$ into the nearest point in $\Theta$. For the R-M algorithm to converge, the gradient estimate should be unbiased. The step-size sequence $\{a_k\}$ is usually chosen as the harmonic series $a_k=c/k$, where c is a positive scalar. It can be shown that the R-M algorithm will converge with probability one to a local stationary point of Y(G).

Consider the system model $$y = H(Gz + u^*) + w.$$

The average symbol error rate is obtained by $Y(G)=E\{\gamma(y, z, H, G)\}$ where $\gamma(y, z, H, G)$ is the empirical error-rate given by H, G, and z. We can write, $$Y(G) = E(\gamma(y, z, H, G))$$
$$= \int \int \int \gamma(y, z, H, G) p(y, z, H | G) dy \, dz \, dH,$$

where p(y, z, H|G) is the joint probability density function (pdf) of (y, z, H) for a given G. Note that the empirical error rate $\gamma(\cdot)$ cannot usually be given in closed form and it also depends on the structure of the receiver. The design goal is to solve the minimization problem $\min Y_{G \in \Theta}(G)$, where the constraint $\Theta$ guarantees the average power of the codewords. Note that $$Y(G) = E_z E_H E_{y|z,H,G}\{\gamma(y,z,H,G)\},$$

where $$E_{y|z,H,G}\{\gamma(y,z,H,G)\} = \int \gamma(y,x,H,G) p(y|z,HG) dy.$$

For a given channel realization H, codeword z, and lattice generator H, y is Gaussian with mean HGz+Hu and covariance matrix $\frac{1}{2}I_{2MT}$, namely $$p(y|z,H,G)=\pi^{-TM}\exp[-(y-HGz-Hu^*)^T(y-HGz-Hu^*)]. \quad (3)$$

On the other hand, $\nabla_G Y(G)$ cannot be computed analytically, and therefore the constrained RM iterative optimization algorithm is not straightforward to apply. Fortunately, the parameters $Y(G)$ and $\nabla_G Y(G)$ can be estimated. The gradient of $Y(G)$ with respect to G for a given G is given as $$\nabla_G Y(G) = E_z E_H [\nabla_G E_{y|z,H,G}\{\gamma(y, z, H, G)\}]$$

$$= E_z E_H \int \nabla_G \{\gamma(y, z, H, G) p(y|z, H, G)\} dy$$

$$= E_z E_H \int \left\{ \begin{array}{c} \overbrace{(\gamma(y, z, H, G)) p(y|z, H, G)}^{0} + \\ \gamma(y, z, H, G)(\nabla_G p(y|z, H, G)) \end{array} \right\} dy$$

$$= E_z E_H \int \gamma(y, z, H, G) \nabla_G p(y|z, H, G) dy$$

where in the above equation, due to the discrete nature of $z \in \mathbb{Z}^t$, we have applied that with probability one we have $$[\nabla_G \gamma(y,z,H,G)]_i = 0$$

This property follows using that for $z \in \mathbb{Z}^n$ and sufficiently small $\delta$ we have $\gamma(y, z, H, G+\delta G) = \gamma(y, z, H, G)$. Then, we can rewrite the above equation as $$\nabla_G Y(G) = E_z E_H \int \gamma(y, z, H, G) \underbrace{\frac{\nabla_G p(y|z, H, G)}{p(y|z, H, G)}}_{\nabla\log p(y|z,H,G)} \quad (4)$$

$$p(y|z, H, G) dy$$

$$= E_z E_H E_{y|z,H,G} [\gamma(y, z, H, G) \nabla_G \log p(y|z, H, G)].$$

We need to compute $\nabla \log p(y|z, H, G)$, when $y=H(Gz+u)+w$ and $p(y|z, H, G)$ is given in equation (3) above. Notice that computing $\nabla \log p(y|z, H, G)$ is equivalent to computing the gradient of $f(\cdot)$ with respect to G, where $f(\cdot)$ is the exponent of equation (3) given by $$f(G) = -(y - HGz - Hu^*)^T (y - HGz - Hu^*)$$

$$= -y^T y + 2y^T HGz + 2y^T Hu^* - 2u^{*T} H^T HGz -$$

$$u^{*T} H^T Hu^* - \underbrace{z^T G^T H^T HGz}_{v(G)}$$

The (n,l)th entry of the gradient of v(G) is defined as $$\left[\frac{\partial v(G)}{\partial G}\right]_{n,l} = \lim_{\delta \to 0} \frac{v(G + \delta e_n e_l^T) - vG}{\delta}$$

$$= \lim_{\delta \to 0} \frac{2z^T e_l e_n^T H^T HGz\delta + z^T e_l e_n^T \delta H^T He_n e_l^T \delta z}{\delta}$$

$$= 2z_T e_l e_n^T H^T HGz$$

where $e_n$ is the 2MT vector with a one in the n-th position and zeros elsewhere. Therefore, $$\left[\frac{\partial f(G)}{\partial G}\right]_{n,l} = 2y^T He_n e_l^T z - 2u^T H^T He_n e_l^T z - 2z^T e_l e_n^T H^T HGz. \quad (5)$$

Figure 2:
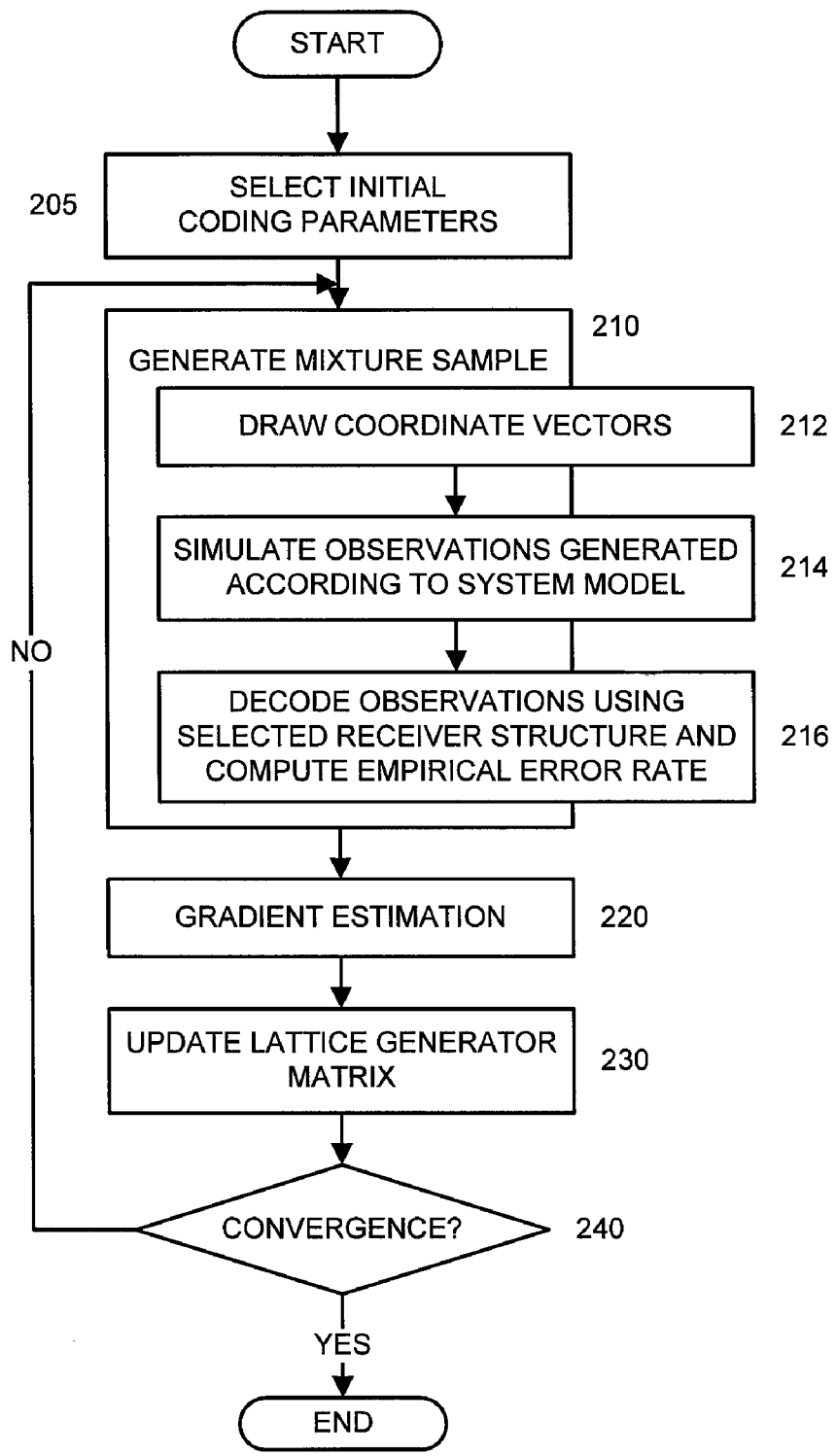
FIG. 2 is a flowchart of processing performed in constructing a set of space-time codes, in accordance with an embodiment of the invention.

FIG. 2 is a flowchart illustrating the disclosed technique for constructing the lattice space time codes. At step 205, initial coding parameters are selected. Then, steps 210 through 240 are performed with the lattice generator being updated during each iteration. Assume that the kth iteration of the current lattice generator is $G_k$. Steps 210 through 240 are performed during the next iteration to generate $G_{k+1}$.

At step 210, a mixture sample is generated by performing steps 212 through 216:

At step 212, L coordinate vectors $z_1, \ldots, z_L$ are drawn uniformly from the set of possible coordinates that generate the codebook.

At step 214, L observations $y_1, \ldots, y_L$ are simulated, where each $y_i$ is generated according to the system model $y_i = H_i (G_k z_i + u_k) + w_i$, $i=1, \ldots, L$.

At step 216, using the given decoding technique for the selected receiver structure, the $z_i$ are decoded based on the observations $y_i$ and the channel value $H_i$, $i=1, \ldots, L$. The empirical error rate $\gamma(y_i, z_i, H_i, G_k)$ is then computed.

At step 220, the score function method is then used for gradient estimation. Using equation (4), generate $$\hat{g}(G_k) = \frac{1}{L}\sum_{i=1}^{L} \gamma(y_i, z_i, H_i, G_k)[\nabla_G \log p(y_i|z_i, H_i, G)|_{G=G_k}], \quad (6)$$

where the gradient is given in equation (5).

At step 230, the new lattice generator matrix $G_{k+1}$ is updated. Generate $$G_{k+1} = \Pi_\Theta(G_k - a_k \hat{g}(G_k)) \quad (7)$$

where $a_k = c/k$ for some positive constant c. And for a given lattice generator matrix G, the projection function $\Pi_\Theta$ is defined as a scalar factor $\beta$ and translation vector $(u_{k+1})$ so the power constraint in equation (2) is satisfied with equality. Note that the gradient estimator is unbiased for any integer L, but the variance decreases for large L.

As noted above, the steps are iterated until convergence at step 240 to an optimal lattice generator for the lattice space time codes.

It is worth mentioning some practical issues with the above code design technique.

At each iteration of the technique, the projection $\Pi_\Theta(\cdot)$ proceeds as follows: (1) enumerate the |C| lattice points closer to $-u$; (2) scale the generator matrix G using $\beta$ in equation (1) to satisfy equation (2). In a practical implementation, it is advantageous to assume $u=0$ and to update the translation vector after the last iteration.

The speed of convergence of the technique is highly determined by the choice of the step-size $a_k = c/k$. The value of c needs to be large enough so that the step-size does not decrease too fast before moving to the vicinity of the optimal generator matrix. On the other hand, it should be small to make the solutions stable as soon as possible. A good value for c can be obtained heuristically by comparing the initial Frobenius norm of G and the Frobenius norm of the estimated gradient.

It can be proved that the gradient estimator is unbiased and that its variance decays with L. Hence, a larger number of samples L can provide a better estimator of the gradient although it will slow the simulation. Instead of increasing the number of samples L, a different possibility is to use the same step-size value over multiple iterations, i.e., $a_k = c/\lceil (k/p) \rceil$, where p is the number of iterations for which the step-size remains constant.

Cooperative Relays. The disclosed technique can be utilized to construct LAST codes with cooperative relaying where idle nodes assist to the active node in the communication of the LAST codewords x=Gz+u. Consider, for example, a very simple cooperative strategy. In particular, consider a 2-hop relay network using amplify and forward relay nodes. This way of relaying allows a lower power consumption at the relaying nodes because there is no need for signal processing power for decoding. All terminals, for ease of illustration, are assumed to be equipped with single antenna transmitters and receivers. Without loss of generality, consider only the amplify and forward relaying protocol in which the source terminal S communicates simultaneously with one relay R and destination terminal D over a first time slot. In the second time slot, R and S simultaneously communicate with D. Consider perfect synchronization and prefect channel state information at the receivers. It is assumed that the channel between S R is also known by the destination.

Figure 3:
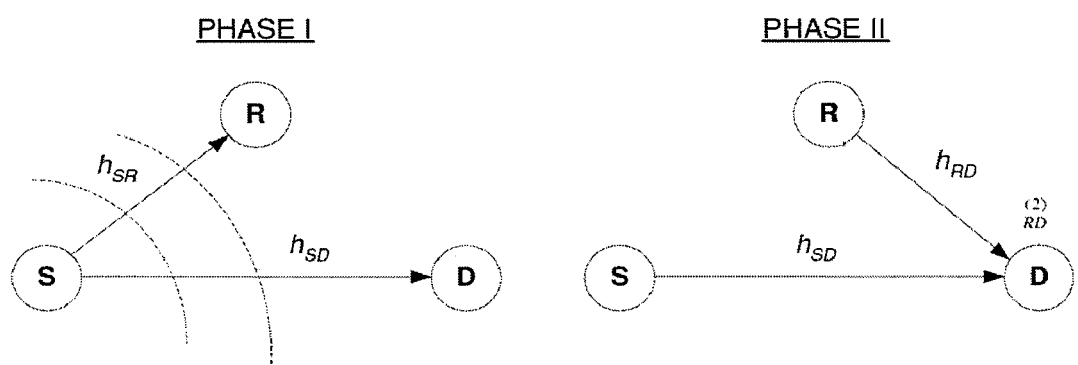
FIG. 3 illustrates a cooperative scenario.

FIG. 3 shows the two consecutive time slots. For simplicity of illustration, it is assumed that S and R are assigned equivalent power. It should be noted that a joint optimization of the assigned powers and code design can be formulated, which complicates the derivation of the gradient required above.

Consider T intervals in the original MIMO case with M co-located antennas, which translates in $T_c = MT$ time intervals in the cooperative case. For example, to mimic the performance of a M=T=2 LAST code, the cooperative relaying requires $T_c = 4$ symbol intervals. Notice that due to the symmetry and periodicity of the lattice in the n-dimensional space and the spherical carving region, it can be observed that the LAST codeword coordinates satisfy $E\{|x_i|^2\} \cong \frac{1}{2}$, i=1, ..., n.

Consider cheap relays, which in a particular time slot can only operate as receivers or transmitters. Among the $T_c$ channel uses, assign $T_c/2$ channel uses to the relay to operate as a transmitter and $T_c/2$ channel uses to operate as a receiver. During phase I, the complex signals received at the destination and the relay are given by $$y_{D,1}^c = \sqrt{\rho} h_{SD}^c (x_1 + jx_2) + n_{D,1}^c$$

$$y_{R,1}^c = \sqrt{\rho} h_{SR}^c (x_1 + jx_2) + n_{R,1}^c.$$

Consider that the noise at destination and the relay is distributed as $\{n_{D,t}^c, n_{R,t}^c\} \sim N_c(0,1)$. The received signal at the relay is normalized to have unit average power, i.e., $\sqrt{E\{|y_{R,1}^c|^2\}} = \sqrt{\rho+1}$. The relay forwards it to the destination during the second time slot-note that in the second time slot, the source also transmits. The received signal at D during the second interval is given by $$y_{D,2}^c = \sqrt{\rho} h_{SD}^c (x_3 + jx_4) + \sqrt{\rho} h_{RD}^c \frac{y_{R,1}^c}{\sqrt{\rho+1}} + n_{D,2}^c$$

$$= \sqrt{\rho} h_{SD}^c (x_3 + jx_4) + \frac{\sqrt{\rho\rho}}{\sqrt{\rho+1}} h_{RD}^c h_{SD}^c (x_1 + jx_2) +$$

$$\underbrace{\sqrt{\frac{\rho}{\rho+1}} h_{RD} n_{R,1}^c + n_{D,2}^c}_{\tilde{n}_{D,2}^c}$$

where it follows that $$\tilde{n}_{D,2}^c \sim N_c\left(0, 1 + \frac{\rho|h_{RD}|^2}{\rho+1}\right).$$

To keep the variance of the noise equal in the first and second time slot, it is advantageous to normalize the received signal during the second slot by $$\omega = \sqrt{1 + \frac{\rho|h_{RD}|^2}{\rho 1}}.$$

The equivalent real input-output relation during the first two time slots (phase I and II) can be written as $$y^{(1)} = \mathcal{H} x^{(1)} + n^{(1)}$$

where $y^{(1)} = \left[ R\{y_{D,1}^c\}, \mathfrak{I}\{y_{D,1}^c\}, R\left\{\frac{1}{w} y_{D,1}^c\right\}, \mathfrak{I}\left\{\frac{1}{w} y_{D,1}^c\right\} \right]^T$, $x^{(1)} = [x_1, x_2, x_3, x_4]^T$, and $$\mathcal{H} = \begin{bmatrix} \sqrt{\rho} R\{h_{SD}^c\} & -\sqrt{\rho} \mathfrak{I}\{h_{SD}^c\} & 0 & 0 \\ \sqrt{\rho} \mathfrak{I}\{h_{SD}^c\} & \sqrt{\rho} R\{h_{SD}^c\} & 0 & 0 \\ \frac{1}{\omega}\sqrt{\frac{\rho^2}{\rho_{SR}+1}} R\{h_{SR}^c h_{RD}^c\} & -\frac{1}{\omega}\sqrt{\frac{\rho^2}{\rho+1}} \mathfrak{I}\{h_{SR}^c h_{RD}^c\} & \frac{\sqrt{\rho}}{\omega} R\{h_{SD}^c\} & -\frac{\sqrt{\rho}}{\omega} \mathfrak{I}\{h_{SD}^c\} \\ \frac{1}{\omega}\sqrt{\frac{\rho^2}{\rho_{SR}+1}} \mathfrak{I}\{h_{SR}^c h_{RD}^c\} & \frac{1}{\omega}\sqrt{\frac{\rho^2}{\rho+1}} R\{h_{SR}^c h_{RD}^c\} & \frac{\sqrt{\rho}}{\omega} \mathfrak{I}\{h_{SD}^c\} & \frac{\sqrt{\rho}}{\omega} R\{h_{SD}^c\} \end{bmatrix}$$

To mimic a LAST code of length T (i.e., $T_c = 2T$), write the same model for $x^{(i)}$, i=2, ..., T (i.e., time intervals 3, ..., $2T_c$) and the equivalent MIMO system can finally be written as $$y = Hx + n$$

where $x = [x^{(1)}, ..., x^{(T)}] = [x_1, ..., x_n]^T = Gz + u$, $y = [y^{(1)T}, ..., y^{(T)T}]^T$, $H = I_T \otimes \mathcal{H}$ is the equivalent n×n MIMO channel, and n conditioned on the channel H is circularly symmetric complex Gaussian noise with $E\{n|H\} = 0$ and $E\{nn^H|H\} \frac{1}{2} I$. Note that multiplexing gain is conspicuously absent, since time is expanded to create a virtual MIMO channel, thereby negating any multiplexing gain. Here, the purpose of the system is to obtain diversity gain.

With this system model, $$p(y|z, H, G) = \pi^{-TM} \exp[-(y - HGz - Hu^*)^T (y - HGz - Hu^*)]$$

and the analysis and technique described above to design the lattice generator G of the LAST codes can then be applied.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. A method of generating lattice space-time codes for a transmission system comprising the steps of-
    (i) selecting an initial lattice generator for the lattice space-time code;
    (ii) simulating a series of observations based on a model of known communication channel characteristics and decoding the simulated series of observations using a selected receiver structure so as to compute an error rate for the lattice generator;
    (iii) estimating a gradient for the error ate rate as a function of the lattice generator;
    (iv) updating the lattice generator for the lattice space-time code using the estimated gradient;
    (v) repeating steps (ii) through (iv) until an optimized lattice generator is obtained for the lattice space-time code and;
    (vi) communicating over a plurality of antennas using the optimized lattice generator.

2. The method of claim 1 wherein the lattice generator is for a spherical lattice.

3. The method of claim 1 wherein the transmission system is a multiple-input multiple-output transmission system.

4. The method of claim 1 wherein the transmission system is a cooperative relay system.

5. The method of claim 1 wherein the selected receiver structure is selected from a group consisting of a maximum likelihood receiver, a naive receiver, a MMSE-GDFE lattice receiver, a MMSE-GDFE lattice-reduction-aided linear receiver, a linear receiver, and a nulling and cancellation receiver.

6. A transmission system which utilizes lattice space time codes generated by the method of claim 1.

7. A transmitter which encodes transmissions using lattice space time codes generated by the method of claim 1.

8. A receiver which decodes transmissions using lattice space time codes generated by the method of claim 1.

* * * * *